United States Patent [19]

Peterson, Jr.

[11] 4,360,168

[45] Nov. 23, 1982

[54] ROTARY BLADE ASSEMBLY FOR PELLETIZER ASSEMBLY

[75] Inventor: Russell I. Peterson, Jr., Oil City, Pa.

[73] Assignee: Conair, Inc., Franklin, Pa.

[21] Appl. No.: 163,435

[22] Filed: Jun. 27, 1980

Related U.S. Application Data

[63] Continuation of Ser. No. 972,065, Dec. 21, 1978, abandoned.

[51] Int. Cl.³ .............................................. B02C 18/18
[52] U.S. Cl. ....................................... 241/294; 83/698
[58] Field of Search ....................... 241/294, 295, 300; 83/698, 839

[56] References Cited

U.S. PATENT DOCUMENTS

| 717,718 | 1/1903 | Saecker | 241/294 |
| 718,061 | 1/1903 | Wagg | 241/294 |
| 2,862,424 | 12/1958 | Jones | 241/294 |
| 3,865,164 | 2/1975 | Sybertz | 241/294 |
| 3,946,474 | 3/1976 | Hahn et al. | 241/294 |

Primary Examiner—Howard N. Goldberg

[57] ABSTRACT

A rotary blade assembly for a pelletizer assembly and more particularly such a blade assembly for use with a pelletizer assembly having a plurality of rotating blades which are cooperable with a stationery bed knife assembly to pelletize material being fed thereto with an improved means for positioning and releasably retaining the rotary blades with respect to the rotating blade carrier member or rotor.

9 Claims, 3 Drawing Figures

ROTARY BLADE ASSEMBLY FOR PELLETIZER ASSEMBLY

This is a continuation of application Ser. No. 972,065, filed Dec. 21, 1978, now abandoned.

Pelletizers are used in various industries with one particular well known use being in the plastics industry. Plastic pelletizers are often used to cut extruded strands of plastics with glass or mineral fillings to pellet size particles for subsequent use in plastics processing. One common type of plastics pelletizer is provided with a stationery bed knife assembly positioned about the cutting circle of a multi-bladed rotary member and with the plastic material being cut or pelletized by the well known cooperative action of the rotating blades and the bed knives.

With existing plastic pelletizers the rotary blades are releasably retained in position in two primary fashions; namely, by a bolt structure directly securing the rotary blades to the rotor or by a wedge which is cooperable with circumferentially adjacent pairs of rotary blades for the frictional retention of such blades. The releasable retention of rotary blades in pelletizers is necessary to permit their replacement, which replacement is required on a frequent basis when an abrasive or hard material is being pelletized; for example, plastics with glass or mineral fillings, requires frequent blade changing and also abraids the exposed portions of fasteners. Furthermore, abrasive or hard materials additionally requires that the rotary blades be manufactured of a wear resistant material such as a carbide.

Although directly bolted rotary blades are satisfactory in many instances such structures require one or more bores directly through the rotary blade. The inclusion of such bores in the blade constructed of hardened material, such as carbide, is costly and may result in stress risers. Further, such bores decrease the section modulus of the blades and hence reduces the maximum bending moment that a blade can withstand at a cross section through the bore area. In many instances, cobolt is included in the metallic compound to enhance the carbide properties to better withstand the above conditions. However, cobolt lessens the abrasive resistance of tungsten carbide and hence results in a shorter cycle between blade changes.

In other pelletizers a wedge member is positioned between adjacent pairs of rotary blades. Such structures permit the utilization of a solid blades, closer spacing between adjacent blades, and simplified assembly and disassembly. In the prior wedge systems, the wedge block is symmetrically received within a pocket in the rotor and a circumferentially spaced pair of blades would be symmetrically arranged in the pocket to bear against respective wedge surfaces. The only bearing surfaces with such prior wedge systems were transversely spaced bearing areas at adjacent surfaces of the wedge and blades and the wedge was operative to frictionally retain the blades within a respective pocket. With such prior wedge structures the blades are mounted in a radial fashion and extend in a direction substantially normal to the cutting circle. Experience has shown that such a radial mounting arrangement can create on undesirable cutting condition as the rotating blades pass the stationary or bed knife structure. Specifically, such a mounting likens the possibility of a snapping or impact type of severing action rather than a shearing fashion. Inasmuch as many of the modern plastics are specifically formulated to withstand impact and snapping, power requirements as well as noise levels can be relatively high with respect to the radial rotary blade mounting. Furthermore as the blade edges become only slightly dull, these conditions become even more excessive as substantial heat is generated and the edges of the plastics being pellitized are broken rather than cut.

The present invention utilizes an improved wedge member which carries the rotary blades in a more tangential orientation with respect to the cutting circle and also includes an auxiliary bearing surface spaced from the wedge-blade bearing surfaces to overcome the hereinabove mentioned problems, or in the least, greatly alleviate them. Specifically the tangential orientation will result in the cooperative action of the rotary blades with one bed knife structure yielding an action more closely resembling shear with respect to the plastics being pelletized. Still further if the above mentioned auxiliary bearing surface were not included the retaining force on circumferentially adjacent blades would not necessarily be uniform (i.e. due to such causes as rough mating surfaces, debris build up, tolerance inaccuracies, wear and improper blade and wedge insertion) so that one blade may have more of a tendency to move relative to the pocket than the other blade. Furthermore, since during operation each blade is subject to impact loading on a cyclical basis, such a non-uniformity of blade retaining forces can cause the "looser" blade to repeatedly move in its retaining pocket to the point that the retaining force is still further reduced. The more loosely retained blade is noisy and results in inefficient operation. Furthermore during operation even the slightest movement of any blade may result in complete destruction of the pelletizer assembly. However, the inclusion of the auxiliary bearing surface of the present invention provides a guiding surface for more uniform wedge insertion and additionally provides a bearing surface which is operative to better insure uniformity of retaining forces on adjacent pairs of blades during operation of the pelletizer.

These and other advantages of this invention will become more readily apparent upon a reading of the following description and drawings in which.

One known form of a plastics pelletizer 9 comprises a generally cylindrical rotary member 10 which carries a plurality of circumferentially spaced longitudinally extending rotary blade assemblies 12 thereon. Rotary member 10 is rotatably driven by a central elongated shaft 14 which is suitably supported for rotation by a pelletizer housing (not shown). Shaft 14 and member 10 are coaxial with respect to a central longitudinal axis X—X and rotary blade assemblies 12 extend in a direction essentially parallel thereto.

Figure 1:
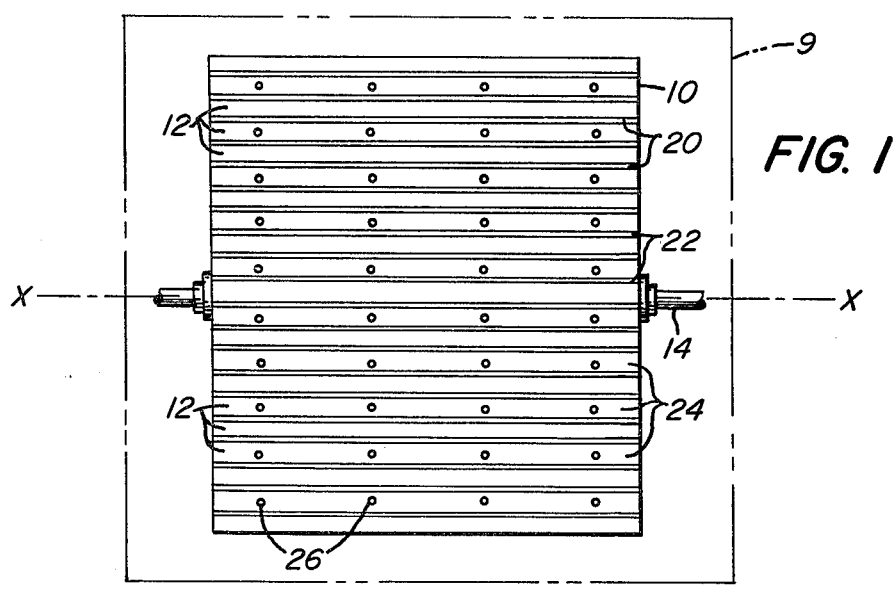
FIG. 1 is a schematic end view of a rotor assembly portion of a pelletizer which incorporates the blade assemblies constructed in accordance with the principles of the present invention.
Figure 2:
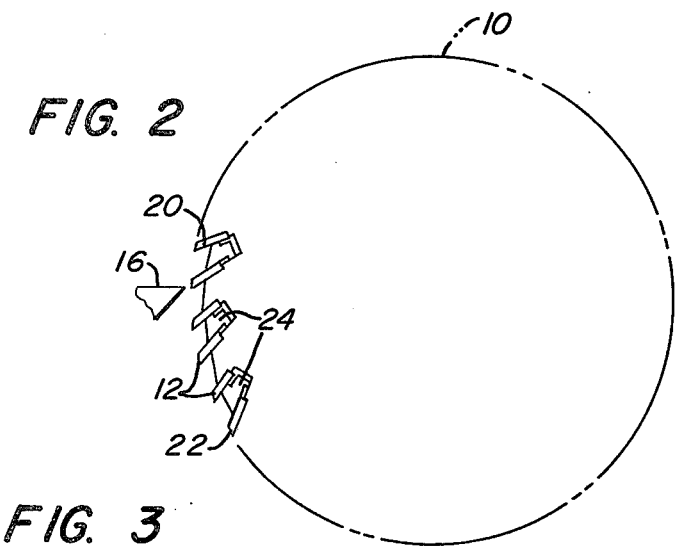
FIG. 2 is a schematic side view of a portion of the rotor assembly illustrated in FIG. 1.
Figure 3:
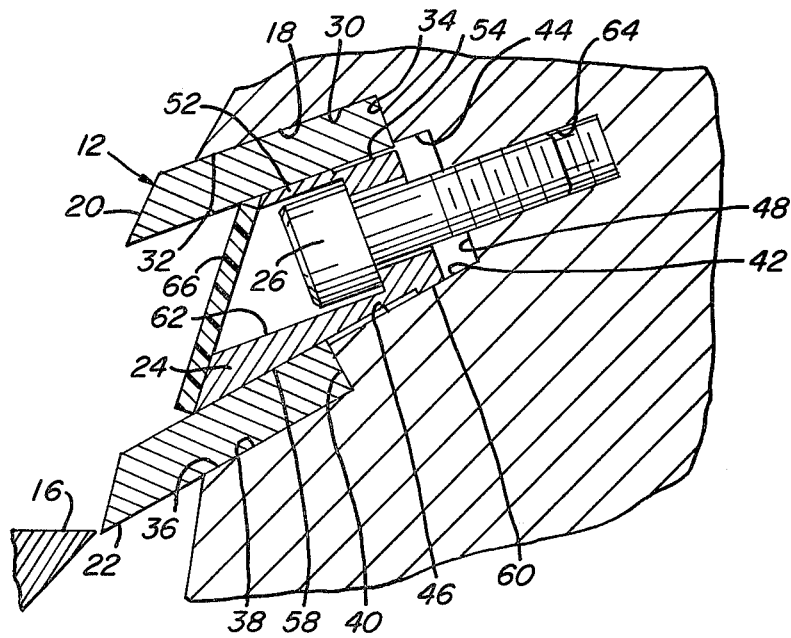
FIG. 3 is a transverse cross sectional view of a pelletizer blade assembly constructed in accordance with the principles of the present invention.

In operation, suitable material to be pelletized, for example, plastic strands from an extruder, are directed to pelletizer 9 in the usual manner and are pelletized by the known cooperation and interaction between rotary blade assemblies 12 and a stationary bed knife assembly 16. Inasmuch as this invention is to the construction of the rotary blade assemblies 12 and the operation, configuration and driving arrangement of pelletizer 9 may be of any well known type, a detailed description and showing of the pelletizer 9 is not necessary to one skilled in the art for a full understanding of the invention herein. Accordingly, FIGS. 1 and 2 are merely schematic representations for the purpose of orientation of the rotary blade assemblies 12 which are shown in detail in FIG. 3.

The rotary member 10 includes a plurality of circumferentially spaced outwardly open elongated blade assembly receiving slots or channels 18 formed therewithin. Each channel 18 is open ended, extends across the longitudinal extent of member 10 and has a generally uniform cross-section. An elongated rotary blade assembly 12 is received within each channel 18 and the longitudinal extent thereof is substantially co-extensive with respect to the longitudinal extent of channels 18. Rotary blade assemblies 12 each comprise: a circumferentially spaced pair of elongated blades, the upper or trailing blade being designated 20 and the lower or leading blade being designated 22; a wedge shaped retainer member 24 for the frictional retention of blades 20 and 22 in operating position; and a plurality of fastening means, such as bolts 26, for releasably securing wedge members 24 to rotary member 10. Blades 20 and 22 are of known construction and as shown have a generally rectangular configuration with the outer or cutting end portions thereof extending outwardly beyond the rotary member 10 and which slope generally outwardly and downwardly when supported in their operational position.

As is well known, the slope of the cutting edge portions of the blades 20 and 22 is indicative of the direction of rotation of the rotary member 10. As shown, the rotary member 10 is rotatable in a counterclockwise direction with the trailing blade 20 being above the loading blade 22. Accordingly, for convenience of description hereinafter, upper and lower shall respectively be referenced with respect to the upper or trailing blade 20 and the lower or leading blade 22.

Each channel 18 comprises: circumferentially spaced upper and lower longitudinally extending blade seating portions 30 and 36, respectively; and a longitudinally extending wedge receiving portion 42 circumferentially intermediate portions 30 and 36. Upper blades seating portion 30 has a downwardly facing surface 32 which engages an adjacent upwardly facing portion of trailing blade 20 and an outwardly facing radially innermost surface 34 which engages the radially innermost end of blade 20. Similarly, lower blade seating portion 36 has an upwardly facing surface 38 which engages an adjacent downwardly facing portion of leading blade 22 and an outwardly facing radially innermost surface 40 which engages the radially innermost end of blade 22. When operationally seated, blades 20 and 22 have the circumferentially spaced facing surfaces thereof, which spaced surfaces are engaged by wedge member 24 for the blade retention, spaced slightly from surfaces 34 and 40, respectively in a manner that wedge member 24 can extend inwardly therefrom into wedge receiving portion 42.

The wedge receiving portion 42 of channel 18 is in open communication with blade seating portions 30 and 36 and comprises: a radially innermost surface 48; an upper surface 44 which extends between the lower end of surface 34 and the innermost surface 48, the extent of surface 44 being shown as generally parallel to the extent of surface 32; and a lower surface 46 which extends between the upper end of surface 38 and lowermost end of surface 48, the extent of surface 46 being shown as generally parallel to the extent of surface 38. Surfaces 44 and 46 taper slightly radially inwardly from the radially outermost ends thereof and are shown as being generally parallel to the respective surfaces of wedge member 24.

Wedge member 24 is an elongated formed member having: an upper blade bearing surface 52 which continuously engages a radially intermediate portion of the downwardly facing surfaces of trailing blade 20; an upper wedge relief surface 54 which is spaced downwardly from surface 52, and extends inwardly therefrom; a lower blade bearing surface 58 which has a radially outer portion thereof in continuous engagement with a rear or radially inward portion of the upwardly facing surface of the leading blade 22 and extends inwardly therefrom such that the portion of surface 58 which is not in engagement with blade 22 is spaced upwardly from surface 46 of wedge receiving portion 42; and an inner or rear bearing surface 60 which is spaced downwardly from surface 58, is parallel thereto and which continuously engages a transversely intermediate portion of surface 46 of wedge receiving portion 42. It is to be noted that the description hereinabove of wedge member 24 insofar as the relationship thereof with respect to various surfaces of channel 18 and blades 20 and 22 is directed to a fully positioned and assembled rotary blade assembly 12 within a respective channel 18.

With a blade assembly 12 such as described hereinabove, the blades 20 and 22 and retaining wedge member 24 are easily positioned within the channel 18. The fact that surface 60 is displaced inwardly from the portion of surface 58 which engages leading blade 22 permits a relatively loose but guided (by surface 60) initial positioning of wedge member 24.

The positioning of each blade assembly 12 may be accomplished by the longitudinal sliding of blades 20 and 22 and wedge member 24 into the open ended channel 18; or, if preferred, by rotating rotary member 10 to index the particular blade assembly 12 for which blades 20 and 22 are to be replaced or initially positioned to a registry where channel 18 faces upwardly. In the latter instance the blades 20 and 22 and wedge member 24 may merely be radially inserted or dropped into channel 18. In either event, the rear bearing surface 60 significantly aids in the proper positioning of blade assembly 12. Specifically, by maintaining engagement between surface 60 and surface 46 during positioning of wedge member 24, a positive guiding of the member 24 throughout insertion thereof is accomplished. Thus the tendency for tilting the wedge during insertion is substantially reduced. Furthermore, in the event of minor tolerance variances between mating surfaces of member 24 with adjacent mating surfaces of blades 20 and 22, the rear bearing surface 60 will tend to smooth out insertion during the passage of member 24 over these areas of tolerance variance. In both of the above instances, wedge member 24 would have more of a tendency to be finally positioned in a slightly tilted orientation if the member 24 was only guided into final position by the surfaces 52 and 58.

When the primary elements of assembly 12 are positioned, inwardly projecting through bore 62 and blind and threaded bore 64, respectively within members 24 and 10, are coaxial aligned. Bolts 26 extend through bores 62 and into respective bores 64. When bolts 26 are tightened, wedge member 24 is drawn inwardly and releasably retained in final operating position for the frictional retention of the blades 20 and 22. During this tightening up phase, surface 60, in conjunction with the direct wedge-blade bearing areas, aids in guiding the wedge member 24 into proper orientation for the even frictional retention of blades 20 and 22. To aid in the removal of bolts 26, flexible protective snap in caps 66, such as of plastic or the like, are provided. As shown caps 66 are positioned in a manner to cover bore 62 and thus prevent the build up of material therein or the abraiding of the head of bolt 26.

With a blade assembly 12 as described, the wedge member 24 provides three bearing areas; namely an upper bearing area directly communicating with upper blade 20 for wedging blade 20 into seated position, a lower bearing area directly communicating with lower blade 22 for wedging blade 22 into seated position and an inner bearing area at surface 60 for ease of assembly and for facilitating the maintenance of the engagement of the upper and lower seating areas during operation of the pelletizer 9. The upper bearing area of the wedge member 24 extends inwardly of the outer periphery of the rotary member 10 a distance to provide a sufficient area to obtain the desired wedging action on the upper blade 20. The upper wedge relief surface 54 is provided to permit the inner end of the wedge member 24 to be freely inserted into the channel 18. Surface 60 which forms the lower inward bearing surface engages the lower surface 46 of the channel 18. With such three bearing areas the rotary blade assembly 12 becomes locked with respect to the rotary member 10 for the surface 60 engages member 10 at surface 46 and the blades 20 and 22 are biased into engagement, by means of the wedging action, with the rotary member 10. The blades 20 and 22 are individually and sequentially subjected to cyclical impact loading; however, each impact load which may tend to shift the wedge member 24 within the channel 18 is opposed by two spaced bearing engagements to maintain the wedge member 24 in the proper position. Thus, when the lower or leading blade 22 impacts, the load will be resisted by the rotary member 10 at surface 30; however, any tendency of the wedge member 24 to tilt or pivot, and thus cause one of the blades 20 or 22 to loosen, is resisted at surface 60. Similarily, when the upper or trailing blade 20 impacts surface 60 will provide this same bearing to insure the wedged retention of blades 20 and 22.

The invention described herein is the presently preferred embodiment; however, it is understood that various modifications may be made by those knowledgeable in the art without departing from the scope of the invention as defined by the claims setforth hereinafter. For example: the invention herein is equally applicable to pelletizers other than the application to a plastics pelletizer as is described herein; more or less rotary blade assemblies may be provided on the rotary member 10 and the proportional spacing therefore may be varied; the configuration of the inward bearing surface 60 may be varied, such as a plurality of adjacent transversely extending notches on a tapered V configuration with the apex being at the inner most end thereof; and the like.

I claim:

1. An elongated rotary blade assembly of the type received within respective ones of a plurality of circumferentially spaced outwardly open elongated channels extending across and inwardly of the face of a rotary member of a pelletizer to form a cutting circle of blades to cooperate with a bed knife structure for pelletizing material upon rotation of the rotary member and wherein each rotary blade assembly includes a pair of circumferentially spaced elongated cutting blades seated on respective circumferentially spaced sides of one of such channels with the ends of such blades located inwardly of such one channel being spaced from the bottom of such one channel to provide an inner side surface portion of such one channel and with an elongated retaining wedge member disposed between opposed surfaces of the blades for retaining the blades within the rotary member, the improvement comprising:

said wedge member including a first blade bearing surface engaging one of said opposed surfaces; said wedge member including a second blade bearing surface engaging the other of said opposed surfaces; and said wedge member having a third surface engagable with the inner side surface portion of such one channel inwardly adjacent the inner end of said one of said blade members.

2. An elongated rotary blade assembly of the type received within respective ones of a plurality of circumferentially spaced outwardly open elongated channels extending axially across and inwardly of the face of an elongated rotor of a pelletizer comprising:

pairs of circumferentially spaced elongated cutting blades seated on circumferentially spaced sides of said channels respectively, with the ends of said blades located inwardly of said channels being spaced from the bottoms of said channels to form side surface portions at the inner ends of said channels, elongated retaining wedge members axially disposed between the circumferentially spaced and opposed surfaces of said pairs of blades, respectively, for retaining said pairs of blades with respect to said rotor, each of said wedge members including a first blade bearing surface engaging one of said opposed surfaces of one of said pairs of blades and a second blade bearing surface engaging the other of said opposed surfaces of said one pair of blades; and each of said wedge members including a third surface spaced inwardly of the inner end of at least one of said blade bearing surfaces, and each of said third surfaces being engagable with the one of said side surface portions adjacent said one of said bearing surfaces.

3. A blade assembly as specified in claim 2 wherein said third surface is spaced circumferentially with respect to both of said opposed surfaces.

4. A knife assembly for a pelletizer or the like comprising, a cylindrical rotor having at least one plurality of circumferentially spaced elongated slots extending inwardly and axially thereof, elongated first knife means having transversely spaced longitudinally extending sides with one side thereof in engagement with one axially extending side of said slots, respectively, elongated second knife means having transversely spaced longitudinally extending sides with one side thereof in engagement with the other axially extending side of said slots, respectively, said first and second knife means having sides thereof in opposed spaced relationship with all of said knife means having a cutting portion extending outwardly beyond said slots with the outermost ends thereof movable through a circular cutting path, at least one of said knife means in each of said slots having the inner end thereof spaced from the bottom portion of the slot in which it is located to provide side surface portions of said slots extending outwardly from the inner ends of said slots, said side surface portions being accessible through the space between said opposed sides of said first and second knife means in said slots, respectively, elongated retaining means having transversely spaced longitudinally extending surfaces in engagement with said opposed sides of said first and second knife means, respectively, said retaining means having integral means engaging said side surface portions respectively, and means for securing said retaining means to such a rotor without interfering with the cutting action of said knife means.

5. A knife assembly as specified in claim 4 wherein said first knife means, said second knife means and said slots are each longitudinally coextensive.

6. A knife assembly as specified in claim 5 wherein each of said retaining means is longitudinally coextensive with each of said knife means.

7. A knife assembly as specified in claim 4 wherein each of said slots is open ended at each axial end of said rotor.

8. A knife assembly as specified in claim 7 wherein each of said knife means extends throughout the axial length of the slot within which it is received.

9. A knife assembly as specified in claim 4 wherein the engagement of said knife means with the sides of said slots is continuous throughout the length thereof.

* * * * *